UNITED STATES PATENT OFFICE.

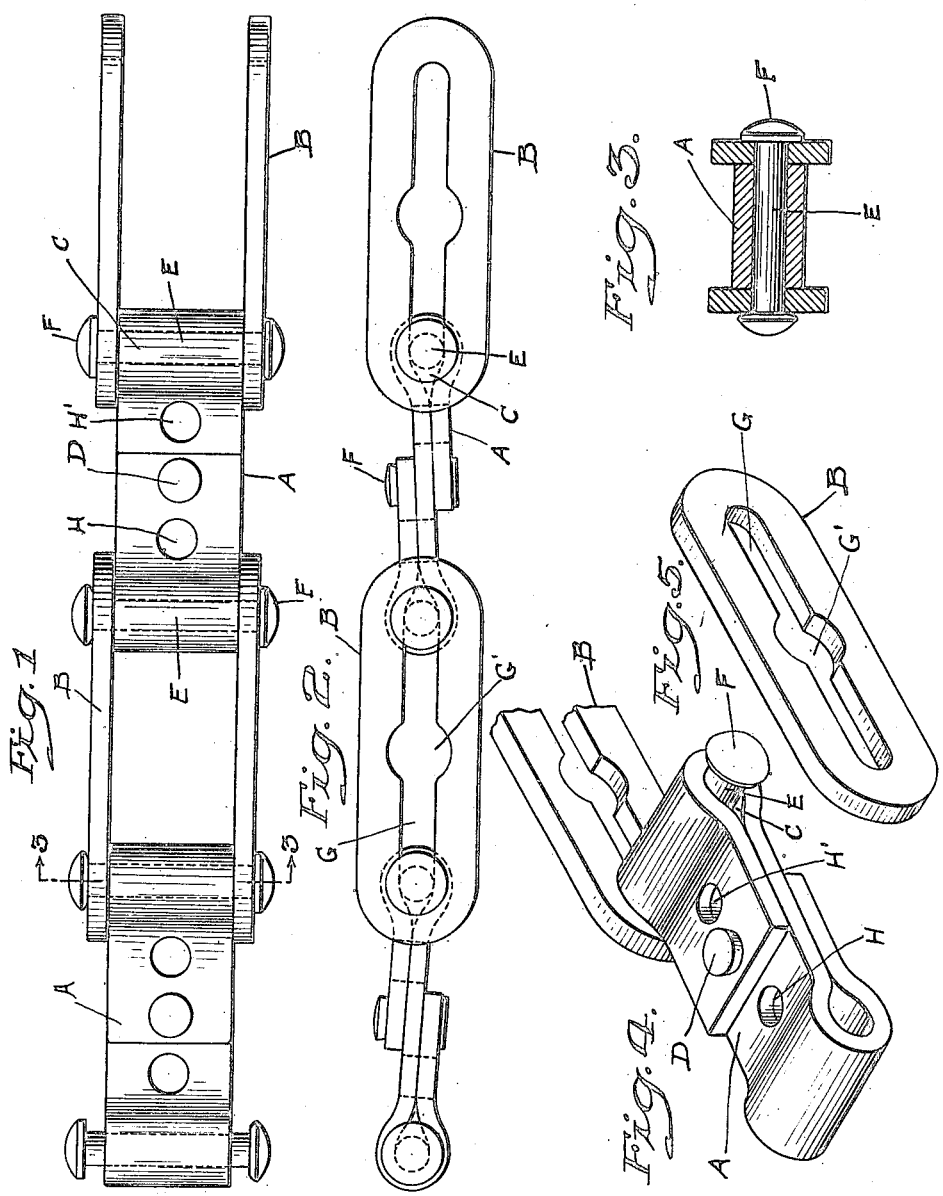

GEORGE L. HELWIG, OF PHILADELPHIA, PENNSYLVANIA.

CHAIN.

1,372,689.

Specification of Letters Patent.

Patented Mar. 29, 1921.

Application filed April 9, 1920. Serial No. 372,393.

*To all whom it may concern:*

Be it known that I, GEORGE L. HELWIG, a citizen of the United States, residing at Philadelphia, in the county of Philadelphia and State of Pennsylvania, have invented certain new and useful Improvements in Chains, of which the following is a specification.

This invention appertains to chains which are adapted for use as endless chains for conveyers, elevators and the like or may be applied to drive chains for transmitting motion from one part to another.

An object of the invention is to provide a chain of the class described comprising a series of permanent or fixed links alternately with a series of links formed of duplicate side members, fixed connections between the two series of links of such a nature as will allow of a wide latitude of movement to obtain flexibility in the chain; said side members of one of the series of links being detachable for removal or substitution by a minimum relative movement thereof, and at the same time of such a novel construction as will prevent the accidental separation thereof in the event of slack being produced in the chain.

Other objects will appear in the specifications and claims hereinafter contained.

For a full understanding of the invention and the merits thereof and also to acquire a knowledge of the details of construction and the means for effecting the result, reference is to be had to the following detail description and accompanying drawings.

While the invention may be adapted to different forms and conditions by changes in the structure and minor details without departing from the spirit or essential features thereof, still the preferred embodiment is shown in the accompanying drawings, wherein:—

Figure 1 is a top plan view of a section of an assembled chain embodying the invention and showing same adapted for use as a conveyer, elevator or the like; .

Fig. 2 is a side view thereof;

Fig. 3 is a detail transverse view, partly in section, on line 3—3 of Fig. 1, illustrating the connection between the alternating series of links, said connection acting as a bearing for the detachable side members comprising the links B;

Fig. 4 is a detail perspective view illustrating the construction of a permanent or fixed link; and Fig. 5 is a detail perspective view of a detachable member of one of the series of links.

Like parts are referred to by like reference characters throughout the drawings.

The chain is formed of a series of permanent or fixed links A of like formation and a series of duplicate separable side links B, of uniform design, connected in the manner hereinafter described.

The fixed links A are formed of a single piece of metal turned over for a portion of its length on one end and under at the opposite end, so as to form the apertures or passages C in either end of said links A for the positioning therein of pins E. The over and under lapping portions of said links A being firmly secured together by means of the rivets D therethrough. This construction is illustrated in detail in Fig. 4 of the drawings. The length and width of said links A depend upon the particular use for which intended.

The separable duplicate side members comprising the links B are provided with the longitudinal slots G, and said slots G are enlarged, substantially in the center thereof, as indicated by the character G'.

Pins E are positioned loosely in the passages C of the links A and are provided with the heads or outer flanges F to prevent their lateral displacement therefrom and for engagement with the enlarged portion G' of slot G. The said duplicate side members comprising the links B are connected to the fixed links A in manner following, viz:

The enlarged portions G' of the slots G are placed over the heads or outer flanges F of the pins E and the said side members are then slid along said pins E until contact is had with the ends of said slots. Said flanges F are slightly larger in diameter than the width of said slots G but are adapted to enter the enlarged portions G' thereof. The pins E are longer than the passages C in which they are loosely positioned so that portions thereof project from either end of said passages C whereby such projecting portions are utilized as bearings for the duplicate side links B and permit of a considerable latitude of movement in order to provide flexibility in the chain.

With the construction as just described the accidental separation of the side links B by a slack chain is obviated, yet the displacement or substitution of either or both of the duplicate members comprising the links B, as may be requisite, is readily effected by a minimum relative movement thereof; the chain being flexible is moved so as to bring the pins E in register with the enlarged portions G' of the slots G, when the duplicate side members, one or both, may be easily removed and substitution made of a similar member. This is a feature of great utility and of considerable novelty.

If the invention is applied to drive chains for transmitting motion from one part to another then the fixed links A need not be quite the length illustrated in the drawings. Openings H and H' are provided in the links A, as illustrated, to receive any commonly employed means to attach to said links A buckets or the like used in endless conveyers or carriers.

Having thus described my invention what I claim as new and desire to secure by Letters Patent is:—

1. A chain comprising the fixed links A constructed of a single piece of metal turned over at one end and under at the opposite end forming passages, at opposite ends thereof, the over and under lapping portions being riveted together, connecting pins loosely positioned in said passages, separable links B and slots in said links B to engage said connecting pins.

2. A chain comprising the alternating fixed links A constructed of a single piece of metal turned over at one end and under at the opposite end forming passages at opposite ends thereof, the over and under lapping portions being secured together, connecting pins loosely positioned in said passages, separable links B, comprising duplicate side members, slots in said duplicate side members to engage said connecting pins and means to prevent the displacement of said side members, all as substantially shown and described.

3. A chain comprising the alternating fixed links A constructed of a single piece of metal turned over at one end and under at the opposite end forming passages at opposite ends thereof, the over and under lapping portions being riveted together, connecting pins loosely positioned in said passages, said pins projecting from either end of said passages and terminating in flanges, separable links B, comprising duplicate side members, longitudinal slots in said duplicate side members comprising the separable links B, adapted to engage said connecting pins, said slots being enlarged in the medial portion thereof to receive said flanges which are slightly larger in diameter than the width of said slots.

In testimony whereof I affix my signature.

GEORGE L. HELWIG.